May 17, 1966 D. H. SCOFIELD Re. 26,024
ELECTRICAL CONDUCTOR
Original Filed July 2, 1959
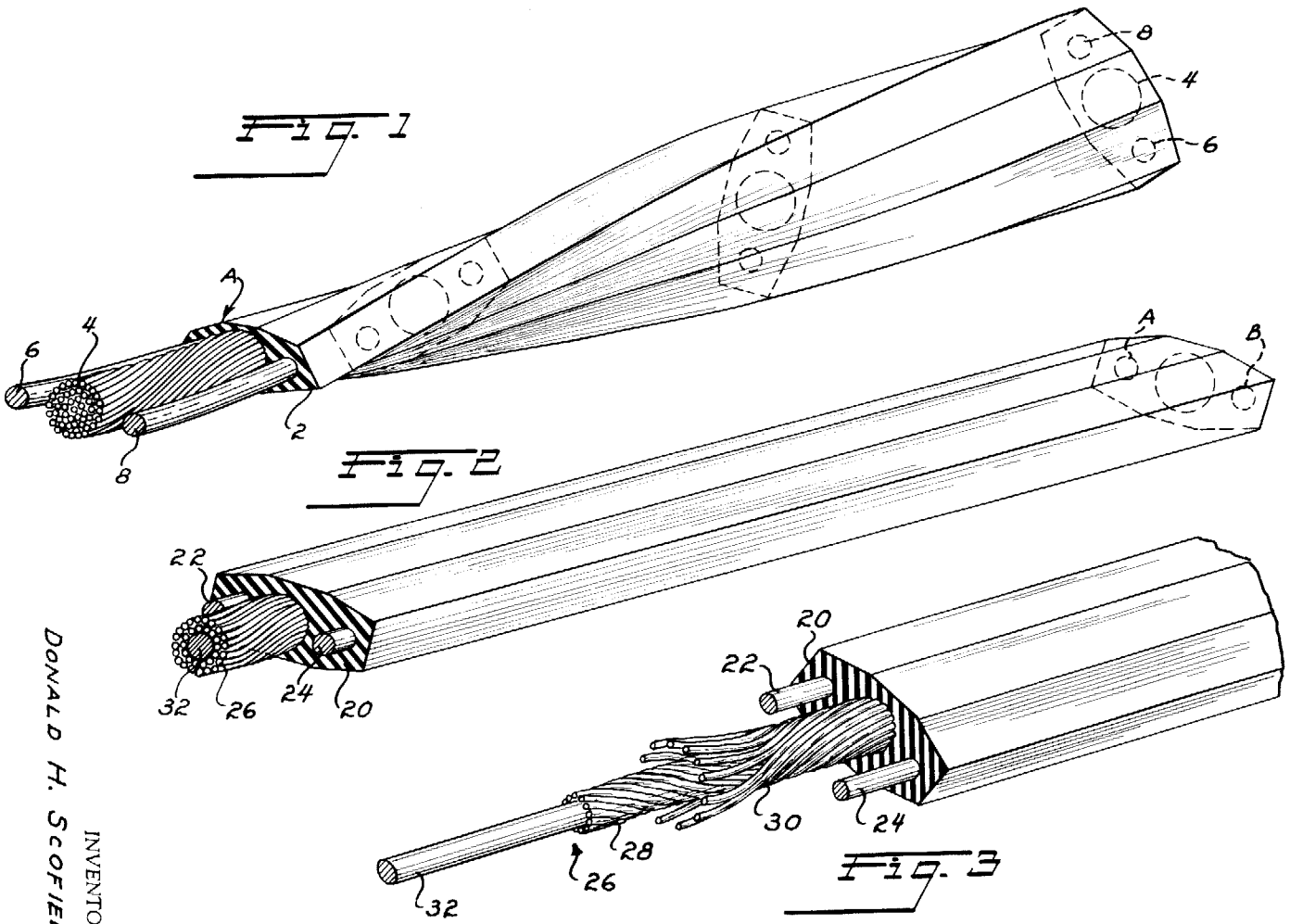
INVENTOR
DONALD H. SCOFIELD
BY Scrivener + Parker
ATTORNEYS United States Patent Office Re. 26,024
Reissued May 17, 1966

26,024
ELECTRICAL CONDUCTOR

Donald H. Scofield, Redwood City, Calif., assignor to Insul-8-Corp., San Carlos, Calif., a corporation of California Original No. 3,060,260, dated Oct. 23, 1962, Ser. No. 824,630, July 2, 1959. Application for reissue Oct. 15, 1963, Ser. No. 316,800
2 Claims. (Cl. 174—117)

Matter enclosed in heavy brackets [ ] appears in the original patent but forms no part of this reissue specification; matter printed in italics indicates the additions made by reissue.

This invention relates broadly to electrical distribution systems for delivering electrical energy to one or more electrically operated devices located within an area to be served, and in which a principal conductor member is suspended within the area and may be tapped at any number of points along its length by connections to the various devices which are to be operated. An important object of the invention has been to provide in such a system a cable-like electrical conductor which is suspended within the area to be served and which comprises not only the electrical conductor means but also other means of high tensile strength for supporting the cable-like conductor in its suspended position.

A suspended electrical distribution system of the type provided by the invention is constructed and intended to perform several functions usually accomplished by more elaborate mechanical and electrical systems. The suspended cable of such a system comprises a central mechanical load carrying member and additional current carrying conductors and is constructed and intended to be strung across large open areas in industrial installations, where it is principally supported by the central load carrying member and to a lesser degree, if at all, by supports spaced along its length. In cables of the type to which the invention relates, the load carrying member and the current carrying conductors are elongated and are embedded, in spaced parallel relation to each other, in electically insulating material, with the conductors closely adjacent the surface of the body of insulating material so that they may be engaged by contact members which either pierce the insulating material or extend through openings therein.

In typical cables of the type to which the invention relates the load carrying member is positioned in the center of the cross section and the current conductors are positioned equidistantly on either side of it or symmetrically about it. It will be apparent that the positions of the conductors must be known and must remain the same with respect to each other in order that the same phase relation will exist throughout the length of the cable and with respect to its two sides. For example, in a two-phase system in which the central supporting cable is grounded and the voltages across the two conductors are of opposite phase, any twisting of the main cable through 180° about its axis will cause the two conductors to lie on the opposite sides of the cable from the positions which they normally and properly occupy. The resultant cross-phasing or reverse phasing, unless corrected by reversal of the take-off contacts, would render the electrical distribution system ineffective to operate the devices which it is intended to energize.

It is, accordingly, the principal object of this invention to provide a cable for an electrical distribution system of the described type which is so constructed that twisting of the cable, with consequent reverse phasing of the conductors, is prevented and substantially eliminated.

The invention is described in the following specification and is illustrated in the accompanying drawing, in which:

FIG. 1 is a perspective view showing a cable of known construction of the general type to which the invention relates, twisted in the manner prevented and substantially eliminated by this invention.

FIG. 2 is a perspective view of a cable constructed in accordance with the invention, with parts removed, and FIG. 3 is a view similar to FIG. 2 but showing the supporting cable and the conductors of the cable with the insulation removed therefrom and with parts of the strands displaced to better illustrate the invention.

In FIG. 1 of the drawings there is shown a conductor cable A of known construction and of the general type to which the invention relates and which comprises an elongated cable-like body 2 formed of electrically insulating material in which there is embedded a stranded wire cable 4 formed of a plurality of helical wire strands all of which have the same direction of lay. This stranded cable is positioned centrally of the generally rectangular cross section of the cable and extends substantially from end to end thereof. Positioned on opposite sides of the cross section of the body of cable 2 and in the disclosed structure but not necessarily embedded in the body 2 are elongated conductor wires 6, 8 which are, respectively, positioned adjacent opposite side walls or edges of the body 2 where they may be engaged by pointed contact members (not shown) which pierce the adjacent parts of the body 2 or extend through openings therein.

In the use and operation of a known conductor cable such as is illustrated in FIG. 1, the ends of the stranded cable 4 are connected to fixed, spaced supports, such as the opposite walls of a room, and the cable is drawn tight between these supports to cause the conductor cable A to be brought to substantially horizontal position supporting the take-off devices and leads connected to it.

It has been found that if the stranded wire rope or cable 4 is formed of strands having the same direction of lay, as in FIG. 1, the entire conductor cable will be turned or twisted about its axis when the ends of the stranded cable are pulled in order to bring the conductor cable into substantially horizontal position. This effect is illustrated in FIG. 1 of the drawing and it will be seen from this figure that the positions of the electric wires 6, 8 are reversed because of the twisting of the cable due to the tensioning of the uni-directionally layed strands of the wire rope or cable 4. This reversal of the positions of the conductors 6, 8 can render the entire electrical distribution system inoperative, it being remembered that these conductors are to be engaged by contact members which are connected to the terminals of an electrical device which is to be energized. It will be apparent that if the electrical device is to be supplied with two-phase energy the contacts which are connected to the terminals of the electrical device must engage the wire conductors 6, 8 in a proper and pre-determined relation in order to supply electrical energy to the electrical device in a pre-determined phase realtionship. If the conductor cable is twisted about its axis in the manner illustrated in FIG. 1, the phase relations of the voltages in the conductors 6, 8 will be reversed and the electrical device connected to the contacts which engage these conductor wires will be supplied with improperly phased electrical energy and will not be operated.

My invention provides an electrical conductor cable of the general type illustrated in FIG. 1 but so constructed that it will not twist about its axis when the central supporting cable is placed under tension in bringing the conductor cable to the substantially horizontal position in which it is usually positioned in operation. A cable having the construction provided by the invention is disclosed in FIGS. 2 and 3 and comprises an elongated, cable-like body 20 formed of electrically insulating material and which may be manufactured by a molding or extrusion sectional shape throughout its length. This cable-like process or the like and which may have any desired cross-body has embedded in it and extending substantially throughout its length two spaced conductor wires 22, 24 which are adapted, as with other cables of this type, to be engaged by contact members connected to the terminals of a device, tool or the like which is to be energized, and which contacts either pierce the insulating material of which the cable 20 is formed or extend through openings in the insulating material. The conductor cable 20 also has embedded therein and extending substantially throughout its length a cable, rope or the like 26 which not only provides the sole means for supporting the entire distributor cable, but also is connected to ground so that it may provide a ground terminal for the energizing circuits for the electrical devices which are to be operated.

In accordance with the invention the cable 26 is formed of stranded construction and comprises at least two layers of strands which are layed in opposite directions. Thus, as shown in FIGS. 2 and 3 of the drawings, the cable, which is indicated generally at 26, comprises an inner layer 28 formed of helical strands layed in one direction and an outer layer 30 of helical strands layed in the opposite direction. In the embodiment of the invention disclosed in FIGS. 2 and 3 of the drawings there is also provided a central or inner core or rod 32 which is positioned within the inner layer 28 and which may be formed of a plastic or other suitable light-weight, bendable material. It will be understood that this interior member 32 may be omitted entirely without departing in any way from the invention, the principal feature of which is the provision of an embedded cable formed of layers of oppositely-layed strands and which is provided for the purpose of supporting the entire conductor cable and acting as the ground for the electrical circuit including the conductor wires. These layers of oppositely-layed strands prevent any twisting of the cable 26 about its own axis when the cable is placed under tension in supporting the entire conductor cable, for the reason that the tension applied to the strands of the two layers will cause equal and opposite forces to be set up in the cable 26 acting in opposite directions about the axis thereof. These forces will cancel each other and prevent any twisting of the cable about its own axis, in this way preventing the effect illustrated in FIG. 1 and causing a cable constructed in accordance with the invention to be maintained and held always in untwisted condition, thus preventing reversal of the positions of the spaced conductors 6, 8.

While I have described and illustrated certain forms which my invention may take, it will be understood that other embodiments, as well as modifications of those disclosed, may be made and practiced without departing in any way from the spirit or scope of the invention, for the limits of which reference must be made to the appended claims.

What is claimed is:

*1. In an* [An] electrical *cable-like* conductor device constructed and intended to be suspended *across large open areas, said cable-like conductor device maintaining the same phase relation throughout its length so that contact members may engage any point of said device and be supplied with properly phased electrical energy;* [for engagement by contact members, comprising] an elongated unitary cable-like body formed of electrically non-conductive material, said body at each cross-section throughout its length having a central part of maximum thickness and oppositely extending side parts, each of said side parts being defined by upper and lower walls which converge outwardly from the central part, an elongated cable-like supporting and grounding member of substantial strength embedded within said central part and extending substantially throughout the length of the elongated body, said supporting member comprising an inner member [of circular cross-section] surrounded by a single layer of solid strands helically wound around the inner member in close engagement with said inner member and with each other and a second layer of solid strands helically wound around said first layer of strands in close engagement with each other and with said first layer, the strands of each of said concentric layers being laid in a direction opposite to that of the strands of the adjacent layer *to prevent twisting of said elongated cable-like supporting and grounding member about its own axis when said member is placed under tension,* and an elongated electrically conductive member positioned within each of said side parts on opposite sides of said supporting member and extending substantially throughout the length of the cable-like body and adapted to be engaged by electrical contact members extending through the non-conductive material of the cable-like body, *said non-twisting supporting member maintaining a predetermined phase relationship between said conductive members throughout the length of said cable-like body.*

*2. In an electrical cable-like conductor device constructed and intended to be suspended across large open areas, said cable-like device maintaining the same phase relation throughout its length so that contact members may engage any point of said device and be supplied with properly phased electrical energy; an elongated unitary cable-like body formed of solid electrically non-conductive material having a uniform, non-circular, cross-sectional configuration; means for supporting said cable-like body including a supporting and grounding cable of substantial strength solidly embedded within said solid electrically non-conductive material and extending substantially throughout the length of the elongated body, said supporting and grounding cable including means for producing equal forces acting in opposite directions about the cable axis when the cable is placed under tension to prevent twisting of the cable about its own axis when the cable supports said cable-like body, and at least two elongated, electrically conductive members solidly embedded within said solid, electrically non-conductive material in fixed parallel spaced relation to one another, to said cable, and to the non-circular exterior of the insulation material, said conductive members extending substantially throughout the length of the cable-like body and adapted to be engaged at any point of said cable-like body by electrical contact members extending through the non-conductive material of the cable-like body; said non-twisting cable maintaining a predetermined phase relationship between said conductive members throughout the length of said cable-like body.*

References Cited by the Examiner

The following references, cited by the Examiner, are of record in the patented file of this patent or the original patent.

UNITED STATES PATENTS

| | | | |
|---|---|---|---|
| 1,201,290 | 10/1916 | Harrison | 174—108 |
| 1,904,114 | 4/1933 | Baum | 174—128 |
| 1,950,858 | 3/1934 | Metcalf | 57—149 |
| 2,261,986 | 11/1941 | Frank et al. | 339—23 |
| 2,463,590 | 3/1949 | Arutunoff | 174—108 |
| 2,589,507 | 3/1952 | Noyes | 174—108 |
| 2,779,149 | 1/1957 | Schuller | 57—148 |
| 2,950,338 | 8/1960 | Taylor | 174—40 |

FOREIGN PATENTS

| | | |
|---|---|---|
| 834,353 | 5/1938 | France. |
| 12,835 | 1849 | Great Britain. |
| 424,995 | 9/1947 | Italy. |

LARAMIE E. ASKIN, *Primary Examiner.*

E. JAMES SAX, BENNETT G. MILLER, JOHN P. WILDMAN, *Examiners.*

S. SACKS, K. R. PETERSON, *Assistant Examiners.*